United States Patent
Arnold et al.

(10) Patent No.: US 11,435,007 B2
(45) Date of Patent: Sep. 6, 2022

(54) ELECTROMAGNETIC VALVE

(71) Applicant: GEA Tuchenhagen GmbH, Büchen (DE)

(72) Inventors: Wolfgang Arnold, Großerlach (DE); Julius Pretterebner, Aidlingen (DE); Hans-peter Magnus, Stuttgart (DE)

(73) Assignee: GEA Tuchenhagen GmbH, Büchen (DE)

( * ) Notice: Subject to any disclaimer, the term of this patent is extended or adjusted under 35 U.S.C. 154(b) by 0 days.

(21) Appl. No.: 17/286,332

(22) PCT Filed: Oct. 7, 2019

(86) PCT No.: PCT/EP2019/077066
§ 371 (c)(1),
(2) Date: Apr. 16, 2021

(87) PCT Pub. No.: WO2020/078751
PCT Pub. Date: Apr. 23, 2020

(65) Prior Publication Data
US 2021/0381618 A1    Dec. 9, 2021

(30) Foreign Application Priority Data
Oct. 18, 2018    (DE) .................... 10 2018 008 266.1

(51) Int. Cl.
*F16K 31/08*    (2006.01)
*F16K 31/06*    (2006.01)
(Continued)

(52) U.S. Cl.
CPC ........ *F16K 31/082* (2013.01); *F16K 31/0651* (2013.01); *F16K 31/0658* (2013.01);
(Continued)

(58) Field of Classification Search
CPC ............... F16K 31/082; F16K 31/0651; F16K 31/0658; F16K 31/0679; H01F 7/081; H01F 7/122; H01F 2007/085
See application file for complete search history.

(56) References Cited

U.S. PATENT DOCUMENTS 3,178,151 A *  4/1965  Caldwell ............... H01F 7/1615
                                                          335/229
4,751,487 A *  6/1988  Green, Jr. ............. H01F 7/1615
                                                           335/79
(Continued)

FOREIGN PATENT DOCUMENTS

DE        1600717 U      2/1950
DE      39 05 992 A1     9/1989
(Continued)

*Primary Examiner* — Eric Keasel
(74) *Attorney, Agent, or Firm* — Young Basile Hanlon & MacFarlane, P.C.

(57) ABSTRACT

A process component includes a first connection, a second connection, and an adjusting element arranged in a hollow space fluidically connecting the first connection to the second connection and that can be brought into a first position and second position in an axial direction within the hollow space. The component includes a permanent magnet, a first electrical coil, and a second electrical coil arranged in succession in the axial direction to create a simple process component whose size can be effectively scaled. The magnet, adjusting element, and a yoke form a first closed magnetic circuit in the first position and a second closed magnetic circuit in the second position. The first and second coil respectively compensate for the first circuit and the second circuit. The hollow space and adjusting element are shaped such that the valve can be penetrated by a fluid flow formed between the first and second connections.

20 Claims, 3 Drawing Sheets

(51) Int. Cl.
*H01F 7/08* (2006.01)
*H01F 7/122* (2006.01)

(52) U.S. Cl.
CPC ......... *F16K 31/0679* (2013.01); *H01F 7/081* (2013.01); *H01F 7/122* (2013.01); *H01F 2007/085* (2013.01)

(56) References Cited

U.S. PATENT DOCUMENTS

| | | | | |
|---|---|---|---|---|
| 5,365,210 | A | * | 11/1994 | Hines .................... H01F 7/1615 335/229 |
| 6,158,713 | A | * | 12/2000 | Ohya .................... F16K 31/082 251/129.21 |
| 9,345,460 | B2 | * | 5/2016 | Houser ............ A61B 17/12109 |
| 2007/0241298 | A1 | | 10/2007 | Herbert et al. |
| 2015/0129790 | A1 | | 5/2015 | Sudel et al. |

FOREIGN PATENT DOCUMENTS

| | | |
|---|---|---|
| DE | 600 21 062 T2 | 5/2006 |
| DE | 10 2015 005 369 A1 | 10/2016 |
| EP | 0 945 658 B1 | 2/2003 |
| JP | S60-78180 A | 5/1985 |
| WO | 2013/170931 A1 | 11/2013 |
| WO | 2018/145904 A1 | 8/2018 |

\* cited by examiner

ELECTROMAGNETIC VALVE

TECHNICAL FIELD

The invention relates to a process component, such as an electromagnetic valve.

BACKGROUND

In the food industry, in biotechnology and in pharmacy, the highest standards for cleanliness, ability to be cleaned, and closedness are placed on the production installations and their process components.

In one type of process component, an adjusting element is moved in its interior between two end positions, for example the closing member between an open and a closed position in a valve. The challenge is now to keep the interior of the process component sealed off from an exterior space to establish hygienic and aseptic conditions and at the same time to effect a movement of the adjusting element in the interior from the exterior space.

In valve technology, it is known for this purpose to seal off the passage of a switching rod, which connects the drive and closing member to each other, into the valve housing with a bladder EP 945658 B1 or a diaphragm WO2013/170931 A1. The mechanical load on these sealing members, however, is a vulnerability.

It would be more advantageous to perform the movement of the closing member contactlessly and without a switching rod. This is known in the field of what are known as filling valves, with which, for example, bottles and cans are filled.

DE 1 600 717 proposes configuring the closing member as a magnetic core that is arranged in a magnetic coil and is moved by it. In the open position, a flowing medium flows around the closing member on its entire outer surface.

DE 600 21 062 provides a valve with a needle-shaped closing member. In an open position and in a closed position, the closing member is held by the forces of a permanent magnet arrangement in each case. Each permanent magnet arrangement is associated with one of the positions. In addition, for each position an electrical coil is provided, with which the closing member can be moved against the retaining force of the permanent magnet arrangement of the other position in each case.

BRIEF SUMMARY

Some of the above solutions have been known for decades and are used for relatively small fluid flows and pressures. However, they have never been used for larger pipeline cross-sections, for example in the diameter range of 50 mm to 200 mm.

The present disclosure describes a process component that can be scaled for large line cross-sections with a magnetic arrangement.

The process component possesses a first and a second connection and an adjusting element, which is arranged in a hollow space of the process component fluidically connecting the first to the second connection and can be brought into a first position and second position in an axial direction within the hollow space. The process component further comprises a permanent magnet, a first electrical coil and a second electrical coil. It is now provided that first coil, permanent magnet and second coil are arranged in succession in this order in the axial direction, and a yoke is provided, and permanent magnet, adjusting element and yoke form a first closed magnetic circuit in the first position and a second closed magnetic circuit in the second position, that the first electrical coil is designed to compensate for the first magnetic circuit and the second electrical coil is designed to compensate for the second magnetic circuit, and that the hollow space and adjusting element are shaped in such a way that the process component can be penetrated by a fluid flow that can be formed between the first and the second connection. In this context, compensate means that, for a first magnetic field with a first polarity, a second magnetic field with a polarity opposite to the first magnetic field is generated and superimposed upon the first magnetic field so that the fields cancel each other out in sum.

This arrangement of permanent magnet and coils allows the adjusting element to be held in the positions with permanent magnetic forces. The coils must only be energized to move the adjusting element, or to temporarily generate high retaining forces. Because the magnetic circuits for the first and the second position are fed magnetically by a permanent magnet, only a small amount of magnetic material is necessary. In the interaction of the features, it is achieved that the process component can have a large line cross-section. As a result of these features, magnetic forces are effected in the valve for closing and moving the adjusting element, which magnetic forces stand up to the fluid forces that increase quadratically with the line diameter. The ratio of electrical power consumption to flow-effective line cross-section allows the field of application to be broadened beyond filling valves to process components for the first time, for example in breweries, the dairy industry, and fine chemicals. Thus, a very good scalability is given. Another advantage is the possibility of omitting magnetic material in the adjusting element, which excludes contamination of the product with magnetic material in the event of damage from the start.

The invention will be described and the advantages explained based on an exemplary embodiment.

DETAILED DESCRIPTION

Figure 1:
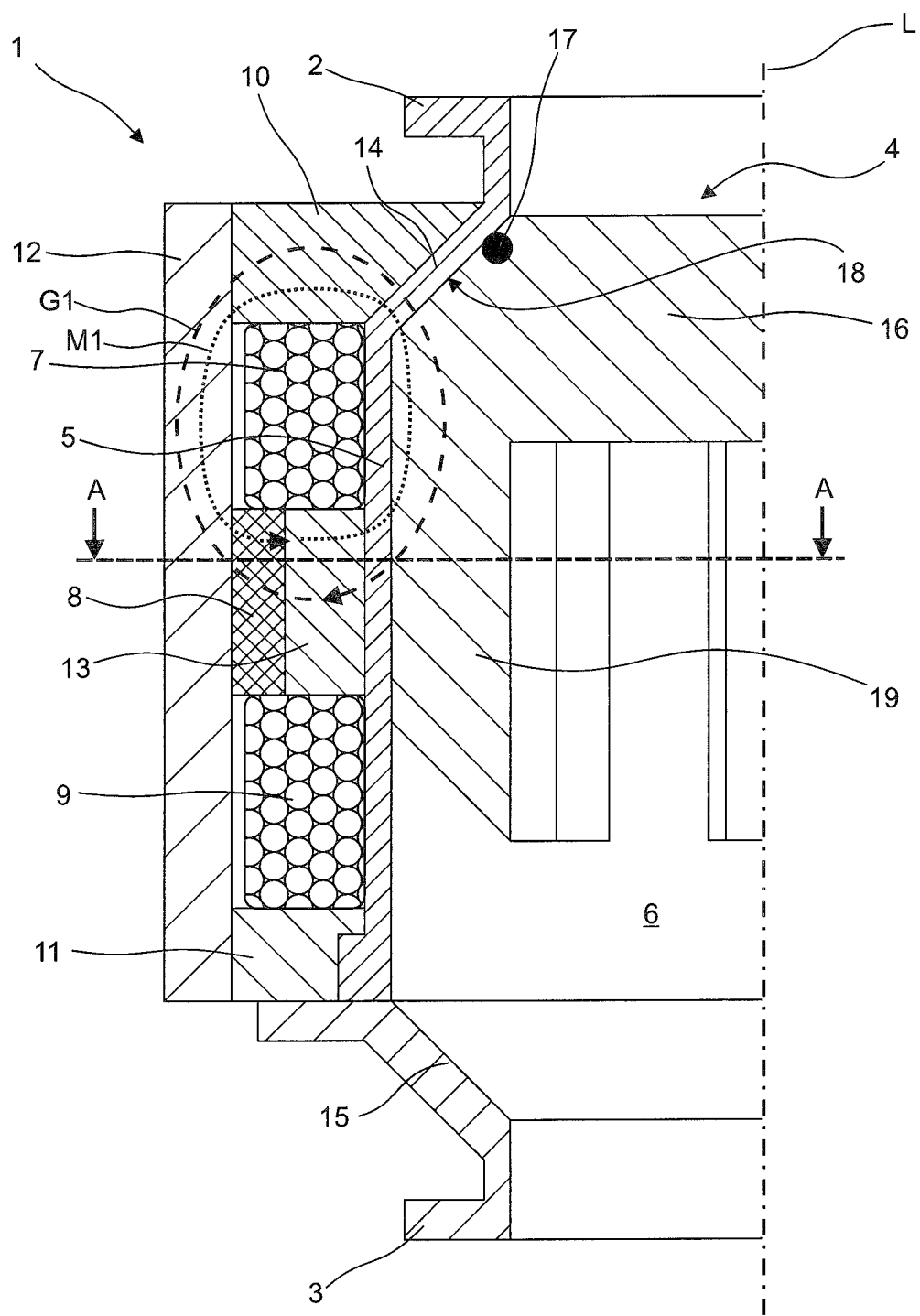
FIG. 1 shows a longitudinal section through a process component in a first position of an adjusting element.

FIG. 1 shows a section along a longitudinal axis L through a process component configured as a valve 1. The valve 1 has a first connection 2 and a second connection 3 for receiving a fluid. These connections 2 and 3 can be connected to the line system of a process installation, for example in the food industry, in biotechnology and in pharmacy.

The valve 1 comprises an adjusting element 4, which is arranged in an inner housing 5 of the valve 1, which comprises a hollow space 6. The hollow space 6 establishes a fluid connection between the connections 2 and 3. The adjusting element 4 can be displaced in the hollow space 6 along the longitudinal axis L and can assume different positions within the inner housing 5. A first position is shown in FIG. 1, a second position in FIG. 2.

A first electrical coil 7 surrounds the inner housing 5 such that its windings run completely around the inner housing 5. A permanent magnet 8 is provided on a side of the first electrical coil 7 that is facing away from the first connection 2. A second electrical coil 9 is arranged on a side of the permanent magnet 8 that is facing away from the first electrical coil 7. This second electrical coil 9 comprises windings that run completely around the inner housing 5. First electrical coil 7, permanent magnet 8 and second electrical coil 9 are thus arranged in this order along the longitudinal axis L and in succession in a thus axial direction.

To guide the magnetic fields that arise and can be generated by the permanent magnet 8 as well as by first electrical coil 7 and second electrical coil 9, a yoke made of magnetically conductive material is provided. The yoke comprises a first terminating element 10 that is arranged on a side of the first electrical coil 7 that is facing the first connection 2 and touches the inner housing 5. On a side of the second electrical coil 9 that is facing the second connection 3, a second terminating element 11 is arranged, which also touches the inner housing 5.

An outer element 12 touches first and second terminating elements 10 and 11 as well as the permanent magnet 8. The permanent magnet 8 can be mounted directly to the inner housing 5. Alternatively, as shown in FIG. 1, a yoke portion 13 can be arranged between permanent magnet 8 and inner housing 5, which yoke portion is in physical contact both with the permanent magnet 8 and the inner housing 5. The yoke portion 13 can be configured integrally with the inner housing 5.

To limit the movement of the adjusting element 4 within the hollow space 6 along the longitudinal axis L, a first mechanical stop 14 and a second mechanical stop 15 are provided. The first mechanical stop 14 is located between the first connection 2 and the first electrical coil 7 with reference to the longitudinal axis L and defines a position of the adjusting element 4 in a first position in the hollow space 6. The second mechanical stop 15 is located between the second electrical coil 9 and the second connection 3 with reference to the longitudinal axis L and defines a position of the adjusting element 4 in a second position in the hollow space 6.

The adjusting element 4 possesses a closure member 16, with which the first connection 2 can be closed. An optional seal 17 is arranged on the adjusting element 4 in such a way that, in the first position of the adjusting element 4 shown in FIG. 1, the closure member 16 sealingly interacts with the first mechanical stop 14. Advantageously, the first mechanical stop 14 comprises a valve seat 18. Adjusting element 4, seal 17 and first mechanical stop 14 can be configured such that a linear contact of the seal 17 with the valve seat 18 occurs and a narrow gap that is sealed with the seal 17 remains between adjusting element 4 and first mechanical stop 14. The gap can be in the range of a tenth of a millimeter.

Figure 2:
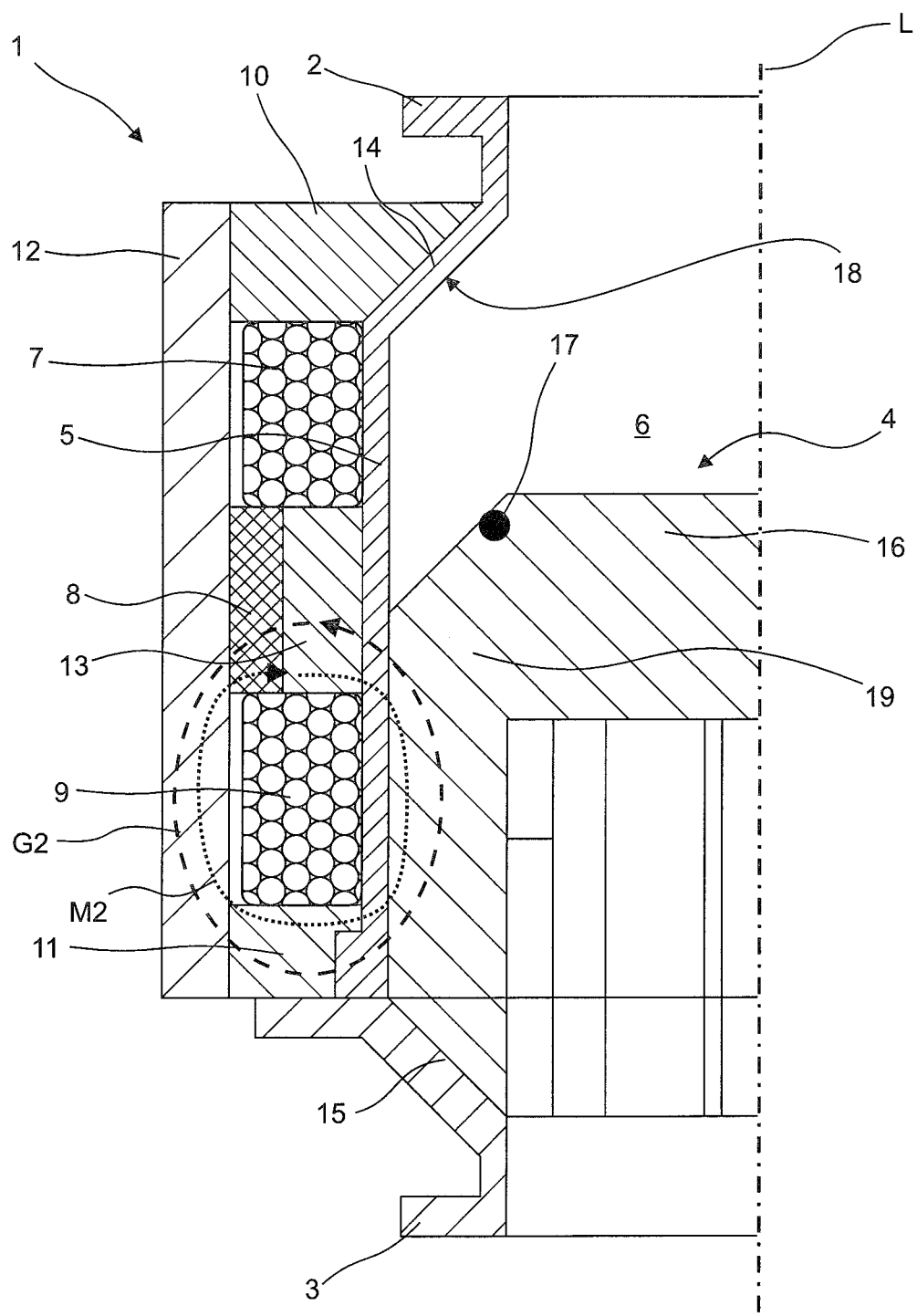
FIG. 2 shows a longitudinal section through a process component in a second position of the adjusting element.

The adjusting element 4 comprises a longitudinal element 19 that extends in the direction of the longitudinal axis L and is formed from a magnetically conductive material. The longitudinal element 19 is preferably configured such that it possesses multiple functions. On the one hand, it possesses a radial expansion, which, together with the longitudinal extension, effects an alignment and guidance of the adjusting element 4 and closure member 16 in the hollow space 6. The expansion of the longitudinal element in the direction of the longitudinal axis L is preferably dimensioned according to the following aspects. In the first position, the longitudinal element 19 is in contact with the first mechanical stop 14. The longitudinal element 19 then extends in the direction of the longitudinal axis L over the first electrical coil 7 and the permanent magnet 8. In a second position, which is shown in FIG. 2, the longitudinal element 19 is located in contact with the second mechanical stop 15. The longitudinal element 19 then extends over the permanent magnet 8 and the second electrical coil 9. Through the interaction with the mechanical stops 14 and 15, the longitudinal element 19 fulfills the function of positioning the adjusting element 4 in the direction of the longitudinal axis L. In addition to the mentioned functions, the longitudinal element 19 also takes on guiding the magnetic fields to close magnetic circuits, as will be explained in more detail below.

In FIG. 1, the adjusting element 4 is shown in the first position, in which it is located in contact with the first mechanical stop 14, wherein the contact exists with the formation of the previously mentioned gap between seal and valve seat 18. In this position, a first magnetic circuit comprising longitudinal element 19, first terminating element 10, outer element 12 and yoke portion 13 is closed. The permanent magnet 8, the magnetic field of which feeds the magnetic circuit, is also located in this magnetic circuit. In the magnetic circuit, a first magnetic field M1 is formed, which effects a retaining force that fixes the adjusting element 4 in the first position.

To remove the adjusting element 4 from the first position, a voltage is applied in a pulsed manner to the first electrical coil 7. The resulting current pulse temporarily applies a first opposing field G1 to the first magnetic circuit. Its polarity is opposite to the first magnetic field M1, such that the fields M1 and G1 largely compensate for each other, no field remains, and the retaining force disappears. The permanent magnet 8 now exerts a reluctance force on the longitudinal element 19, such that the adjusting element 4 is moved out of the first position in the direction of the second mechanical stop 15. To move the adjusting element 4 further into the second position, a voltage for generating a current flow and magnetic field can be applied to the second coil 9, which magnetic field effects the movement of the adjusting element 4.

In FIG. 2, the adjusting element 4 is shown in the second position, in which the longitudinal element 19 of the adjusting element 4 is located in contact with the second mechanical stop 15. In this position, a second magnetic circuit comprising the permanent magnet 8, the second terminating element 11, the outer element 12, the yoke portion 13 and the longitudinal element 19 is closed. In the second magnetic circuit, a second magnetic field M2 is generated by the permanent magnet 8. The field lines of the second magnetic field M2 surround, guided in the mentioned parts, the second electrical coil 9. The magnetic field M2 generates a retaining force that holds the longitudinal element 19 of the adjusting element 4 in contact with the second mechanical stop 15.

To remove the adjusting element 4 from the second position, a voltage is applied in a pulsed manner to the second electrical coil 9. The resulting current pulse temporarily applies a second opposing field G2 to the second magnetic circuit. Its polarity is opposite to the second magnetic field M2, such that the fields M2 and G2 largely compensate each other, no field remains, and the retaining force disappears. The permanent magnet 8 now exerts a reluctance force on the longitudinal element 19 such that the adjusting element 4 is moved out of the second position in the direction of the first mechanical stop 14. To move the adjusting element 4 into the first position, a voltage for generating a current flow and magnetic field can be applied to the first coil 7, which magnetic field effects the movement of the adjusting element 4.

In the second position of the adjusting element 4 according to FIG. 2, the closure member 16 unblocks the first connection 2. The adjusting element 4 and the hollow space 6 are shaped in such a way that the process component can be penetrated by a fluid flow that can be formed between first and second connection 2 and 3. In the example shown, this is achieved in that the longitudinal element 19 extends only over a partial length in the direction of a periphery of the adjusting element 4 and a flow around the closure member 16 can take place in the second position in that a free space between inner housing 5 and closure member 16 is provided at least in portions along the periphery.

Figure 3:
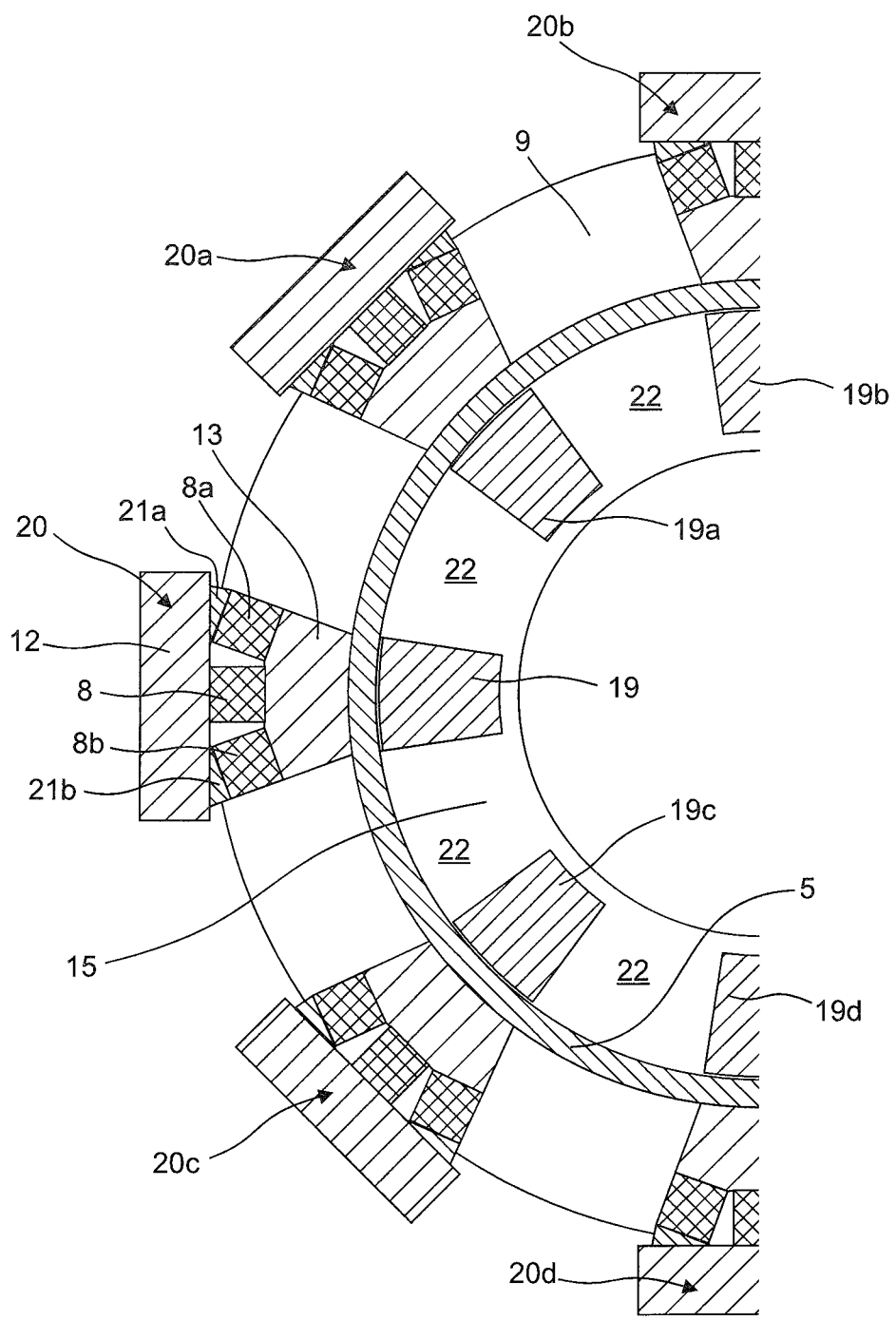
FIG. 3 shows a cross-section through the process component of the first development along the line A-A.

To illustrate this, FIG. 3 shows a section at the height of the line A-A from FIG. 1.

The permanent magnet 8 is arranged between the outer element 12 and the inner housing 5. In a peripheral direction lying in the plane of the drawing, additional permanent magnets 8a and 8b are provided adjacent to the permanent magnet 8 on a first side and a second side opposite the first side. They touch the yoke portion 13, which is wide enough on a side facing away from the inner housing 5 to be in flush contact with all permanent magnets 8, 8a and 8b. On a side facing the inner housing 5, the yoke portion 13 has a width that approximately corresponds to a width of the longitudinal element 19. The dimensions of the yoke portion 13 are selected in such a way that the magnetic fields induced by the permanent magnets 8, 8a and 8b are bundled in the direction towards the longitudinal element 19, penetrate the inner housing 5, and pass into the longitudinal element 19 largely without losses (i.e., the shaping of the yoke effects the bundling of the magnetic field). This results in a high density of field lines in the longitudinal element 19, whereby the retaining force is increased when the magnetic circuit is closed. Instead of a plurality of permanent magnets 8, 8a and 8b, a curved permanent magnet can be used. Alternatively, or additionally, another plane of permanent magnets parallel to permanent magnet 8 in the direction of the longitudinal axis L can be provided. The permanent magnets 8, 8a and 8b are in physical contact with the outer element 12 so that the magnetic fields are transmitted with as few losses as possible. For this purpose, guide pieces 21 (two guide pieces 21a, 21b are shown by example) can be used that prevent gaps. Alternatively, the outer element 12 can have molding members that take on the function of the guide pieces 21a and 21b, or the permanent magnets 8a and 8b are shaped with a form fit. In contrast to the embodiment shown, the yoke portion 13 can be configured integrally with the inner housing 5.

The outer element 12, the permanent magnets 8, 8a and 8b, the yoke portion 13 and the guide pieces 21a and 21b together form a permanent magnet arrangement 20. Preferably, multiple permanent magnet arrangements 20, 20a, 20b, 20c, and 20d are provided spaced from each other along the periphery of the inner housing 5, wherein preferably each one interacts with a single longitudinal element 19 of the adjusting element 4, which has a plurality of longitudinal elements 19, 19a, 19b, 19c, 19d distributed on the periphery thereof for this purpose. A channel 22 for flow guidance is formed between adjacent longitudinal elements 19, wherein the channel 22 continues until the closure member 16. This is to be dimensioned in such a way that fluid can flow around the closure member 16 in the second position, which fluid enters through the first or the second connection 2 and 3, and that a sufficient blocking effect of the closure member 16 is given in the first position to prevent a fluid flow between first and second connection 2 and 3.

In one development, the inner housing 5 is produced from a material with good magnetic conductivity (i.e., the inner housing 5 is a magnetically conductive inner housing) so that the magnetically effective air gaps in the magnetic circuits are reduced, in particular in the region of the yoke portion 13 and the contact regions with the first terminating element and second terminating element 10 and 11. It is advantageous if the magnetic conductivity of the materials for inner housing 5 and longitudinal element 19 are approximately within the same order of magnitude.

It is advantageous to form the first mechanical stop 14, the second mechanical stop 15 or both stops 14 and 15 and the respectively corresponding top surface on the adjusting element 4 conically, as it is shown in FIG. 1 and FIG. 2. As a result of this, when the adjusting element 4 moves in the direction of the longitudinal axis L out of one of first and second position, the increase in the magnetically active gap between terminating element 10 and 11 and adjusting element 4 is smaller than the path traveled by the adjusting element 4 along the longitudinal axis L. In this way, the retaining force is reduced more slowly than, for example, in the case of a top surface that is perpendicular to the longitudinal axis L. Moreover, such a design improves the guidance of a fluid flow through the process component.

The following is a list of reference numbers used in the drawings and this description.

1 Valve
2 First connection
3 Second connection
4 Adjusting element
5 Inner housing
6 Hollow space
7 First electrical coil
8, 8a, 8b Permanent magnet
9 Second electrical coil
10 First terminating element
11 Second terminating element
12 Outer element
13 Yoke portion
14 First mechanical stop
15 Second mechanical stop
16 Closure member
17 Seal
18 Valve seat
19 Longitudinal element
19a, 19b, 19c, 19d Longitudinal element
20, 20a, 20b, 20c, 20d Permanent magnet arrangement
21a, 21b Guide piece
22 Channel
L Longitudinal axis
M1 First magnetic field
M2 Second magnetic field
G1 First opposing field
G2 Second opposing field

The invention claimed is:

1. A process component, comprising:
a first connection;
a second connection;
an adjusting element arranged in a hollow space fluidically connecting the first connection to the second connection that can be brought into a first position and second position in an axial direction within the hollow space;
a permanent magnet; a first electrical coil; and
a second electrical coil; and
a yoke, wherein:
the first coil, the permanent magnet, and the second coil are arranged in succession in this order in the axial direction;

the permanent magnet, the adjusting element, and the yoke form a first closed magnetic circuit in the first position and a second closed magnetic circuit in the second position;

the first electrical coil is designed to compensate for the first magnetic circuit;

the second electrical coil is designed to compensate for the second magnetic circuit; and the hollow space and the adjusting element are shaped in such a way that the process component can be penetrated by a fluid flow formed between the first connection and the second connection.

2. The process component according to claim 1, wherein a first mechanical stop defines a position of the adjusting element in the first position.

3. The process component according to claim 2, wherein a second mechanical stop defines a position of the adjusting element in the second position.

4. The process component according to claim 3, further comprising:
  a valve seat; and
  a closure member arranged on the adjusting element, wherein the closure member sealingly interacts with the valve seat in the first position.

5. The process component according to claim 3, wherein the adjusting element is arranged within a magnetically conductive inner housing.

6. The process component according to claim 5, wherein:
  the adjusting element comprises a longitudinal element that interacts with the yoke to form at least one of the first magnetic circuit in the first position or the second magnetic circuit in the second position; and
  the magnetic conductivity of the inner housing corresponds at least to that of the longitudinal element.

7. The process component according to claim 3, wherein a shaping of the yoke between the permanent magnet and the adjusting element effects a bundling of a magnetic field induced by the permanent magnet.

8. The process component according to claim 2, wherein the adjusting element comprises a longitudinal element that interacts with the yoke to form at least one of the first magnetic circuit in the first position or the second magnetic circuit in the second position.

9. The process component according to claim 8, wherein the longitudinal element comprises a plurality of longitudinal elements distributed on a periphery of the adjusting element and spaced from each other.

10. The process component according to claim 2, further comprising:
  a valve seat; and
  a closure member arranged on the adjusting element, wherein the closure member sealingly interacts with the valve seat in the first position.

11. The process component according to claim 2, wherein the adjusting element is arranged within a magnetically conductive inner housing.

12. The process component according to claim 11, wherein:
  the adjusting element comprises a longitudinal element that interacts with the yoke to form at least one of the first magnetic circuit in the first position or the second magnetic circuit in the second position; and
  the magnetic conductivity of the inner housing corresponds at least to that of the longitudinal element.

13. The process component according to claim 2, wherein a shaping of the yoke between the permanent magnet and the adjusting element effects a bundling of a magnetic field induced by the permanent magnet.

14. The process component according to claim 1, wherein the adjusting element comprises a longitudinal element that interacts with the yoke to form at least one of the first magnetic circuit in the first position or the second magnetic circuit in the second position.

15. The process component according to claim 14, wherein the longitudinal element comprises a plurality of longitudinal elements distributed on a periphery of the adjusting element and spaced from each other.

16. The process component according to claim 1, further comprising:
  a valve seat; and
  a closure member is arranged on the adjusting element, wherein the closure member sealingly interacts with the valve seat in the first position.

17. The process component according to claim 1, wherein the adjusting element is arranged within a magnetically conductive inner housing.

18. The process component according to claim 17, wherein:
  the adjusting element comprises a longitudinal element that interacts with the yoke to form at least one of the first magnetic circuit in the first position or the second magnetic circuit in the second position; and
  the magnetic conductivity of the inner housing corresponds at least to that of the longitudinal element.

19. The process component according to claim 1, wherein a shaping of the yoke between the permanent magnet and the adjusting element effects a bundling of a magnetic field induced by the permanent magnet.

20. The process component according to claim 1, wherein a second mechanical stop defines a position of the adjusting element in the second position.

* * * * *